Figure 1:
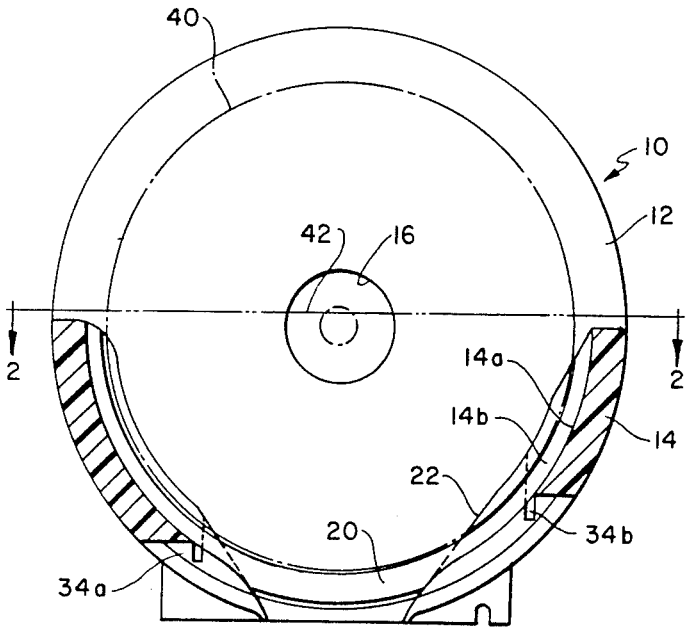
Figure 2:
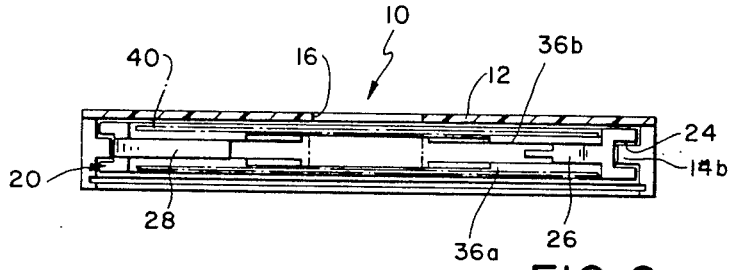
Figure 3:
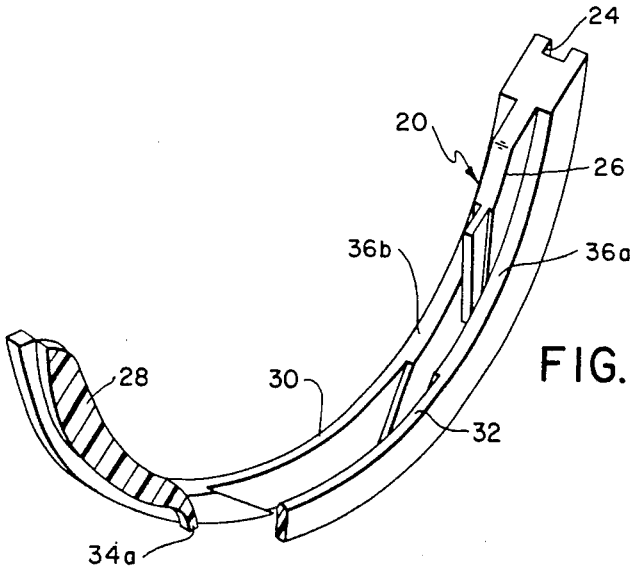

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 9

T929,004

REEL ADAPTER FOR A CARTRIDGE

Clemens Hopfner, 3 Richard-Wagner-Str., 7304 Ruit, Germany, and Wolfgang Ort, 6 Daiberweg, 7 Stuttgart-Bad Cannstatt, Germany

Filed Oct. 10, 1973, Ser. No. 405,716
**Int. Cl. G03b *1/04***
U.S. Cl. 242—71.1
1 Sheet Drawing. 6 Pages Specification

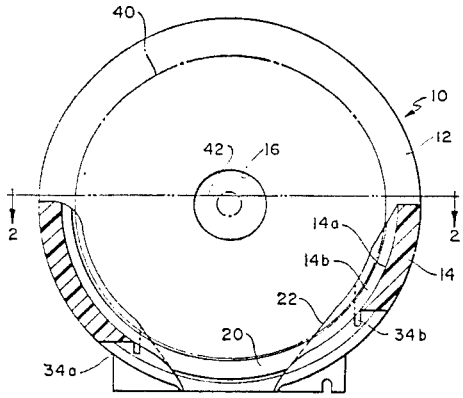

An adapter is provided for supporting a film reel in a film chamber of a cartridge. A preferred embodiment of the adapter includes a first portion adapted to be supported by the walls in the cartridge which define the film chamber and a second portion for cooperating with the circumferential edges of the reel flanges to maintain the film reel in the center of the film chamber and freely rotatably such that a film strip may be wound onto or may be removed from the reel. If desired, the adapter can be made in different sizes so as to permit film reels of different capacities to be supported in a cartridge having a film chamber of a larger capacity. For example, the adapter could appropriately be used to support film reels which are designed to contain film lengths in a range between 200 and 400 feet in film cartridges which are dimensioned to support film reels containing film lengths of approximately 440 feet.

In the preferred embodiment disclosed, the adapter is of a generally arcuate shape and includes an opening between the first and second portions, the opening permitting a film strip to pass therethrough when the film strip is wound onto or removed from the film reel. If desired, the second portion of the adapter can be shaped so as to be partially received between the flanges of the film reel, thereby serving to restrain the film strip from being radially displaced from the reel when the reel is rotatably driven.

REEL ADAPTER FOR A CARTRIDGE

Filed Oct. 10 1973